July 19, 1949.                    E. A. HOBART                    2,476,373
                        COMBINED WELDER AND POWER PLANT
Filed May 28, 1946                                          3 Sheets-Sheet 1
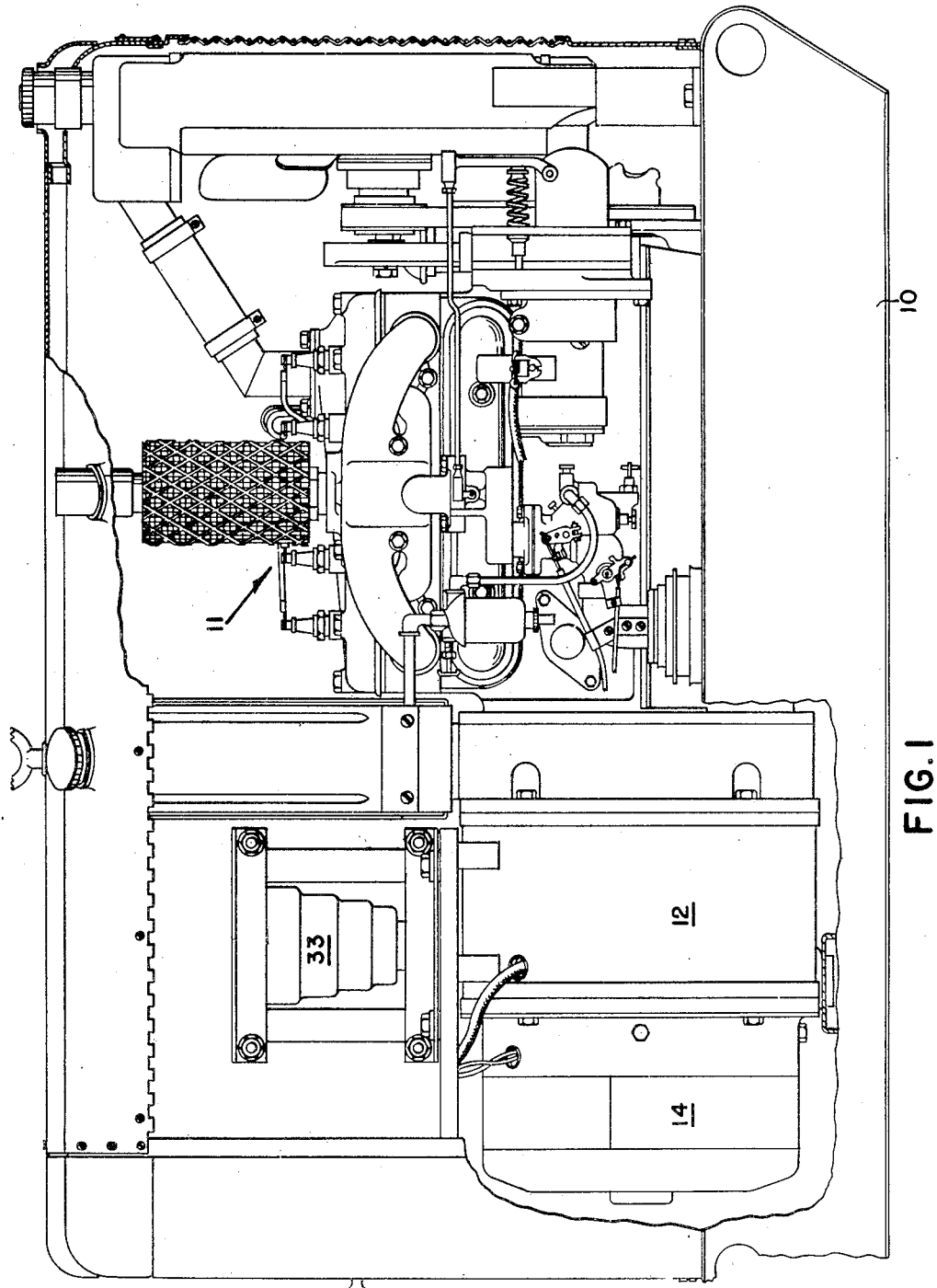
FIG. I
INVENTOR
EDWARD A. HOBART
BY Toulmin & Toulmin
ATTORNEYS July 19, 1949.　　　　　　　　E. A. HOBART　　　　　　　　2,476,373
COMBINED WELDER AND POWER PLANT
Filed May 28, 1946　　　　　　　　　　　　　　　　3 Sheets-Sheet 2
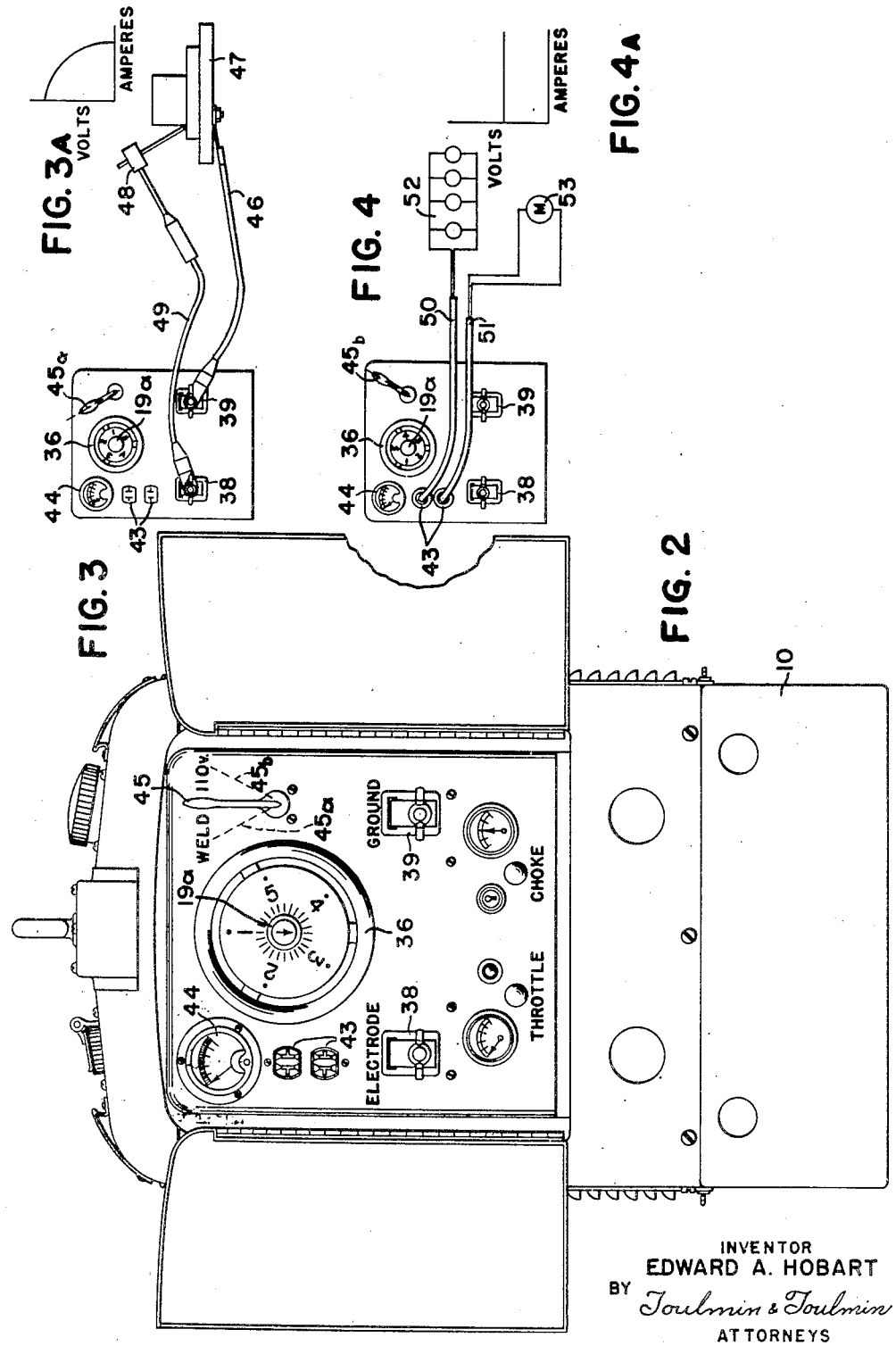
INVENTOR
EDWARD A. HOBART
BY Toulmin & Toulmin
ATTORNEYS July 19, 1949.  E. A. HOBART  2,476,373
COMBINED WELDER AND POWER PLANT Filed May 28, 1946  3 Sheets-Sheet 3

INVENTOR
EDWARD A. HOBART
BY
Toulmin & Toulmin
ATTORNEYS

Patented July 19, 1949

2,476,373

UNITED STATES PATENT OFFICE 2,476,373

COMBINED WELDER AND POWER PLANT

Edward A. Hobart, Troy, Ohio, assignor to The Hobart Brothers Company, Troy, Ohio, a corporation of Ohio Application May 28, 1946, Serial No. 672,856

2 Claims. (Cl. 322—90)

This invention pertains to a combined welder and power plant. More particularly, this invention relates to a dual purpose engine driven generator and electrical control circuit which may be readily converted from a welding outfit to a power plant by the operation of simplified apparatus.

There are two chief differences between the characteristics of a welder and a power plant. A power plant requires a constant voltage of 110 volts with good regulation. A welder should supply a voltage between 60 and 80 volts with a very poor regulation and a drooping characteristic.

One of the objects of this invention is to provide a power driven generator with electrical control mechanism adapted to easy adjustment to obtain either of the aforementioned characteristics of a welder or a power plant.

Another object of this invention is to provide a novel electrical control circuit in conjunction with a power driven generator, including a pair of switches which may be operable with a minimum of effort to control the generator for either welding service or power supply service.

It is also an object of this invention to provide a novel electrical circuit in conjunction with a power driven generator including two switches, a double-pole double-throw switch for controlling the stator windings of an A. C. generator in either parallel or series connection and a second switch which cuts in or cuts out various steps of a reactor used in connection with the welding circuit to give variable output and drooping voltage characteristics required of a welder.

Still another object of this invention is to provide a motor driven alternating current generator of the revolving field type with a circuit including a double-pole double-throw switch for putting the stator windings of the generator in either series or parallel connection so as to provide power circuit voltages or welding circuit voltages for the generator and to provide in conjunction with said circuit a range control switch for regulating a reactor to give variable reactance during the welding operation or to eliminate the reactor from the circuit when the generator is used as a power plant.

It is also an object to provide in conjunction with said last mentioned alternating current generator and circuit, a field rheostat for providing intermediate steps of voltage control for the welding operation or variable voltage control for power supply whereby the unit may be converted from a welder to a power plant by merely placing the aforementioned two switches in correct position.

Further features and advantages of this invention will appear from a detailed description of the drawings in which:

Figure 1 is a side elevation, partly broken away, of a motor driven generator outfit incorporating the features of this invention.

Figure 2 is a left-hand end elevation of the outfit shown in Figure 1 particularly illustrating the control panel for the electric operating and control circuit.

Figure 3 is a diagrammatic view showing the position of the various controls and connecting leads from the control panel to the work and welding electrode during welding operations.

Figure 3a is a diagram showing the voltage to current regulation during welding operations.

Figure 4 is a diagrammatic view showing the position of the controls and connecting leads from the control panel to lights and motors during power supply operations.

Figure 4a is a diagram showing the voltage characteristics when the outfit is used as a power plant.

Figure 5:
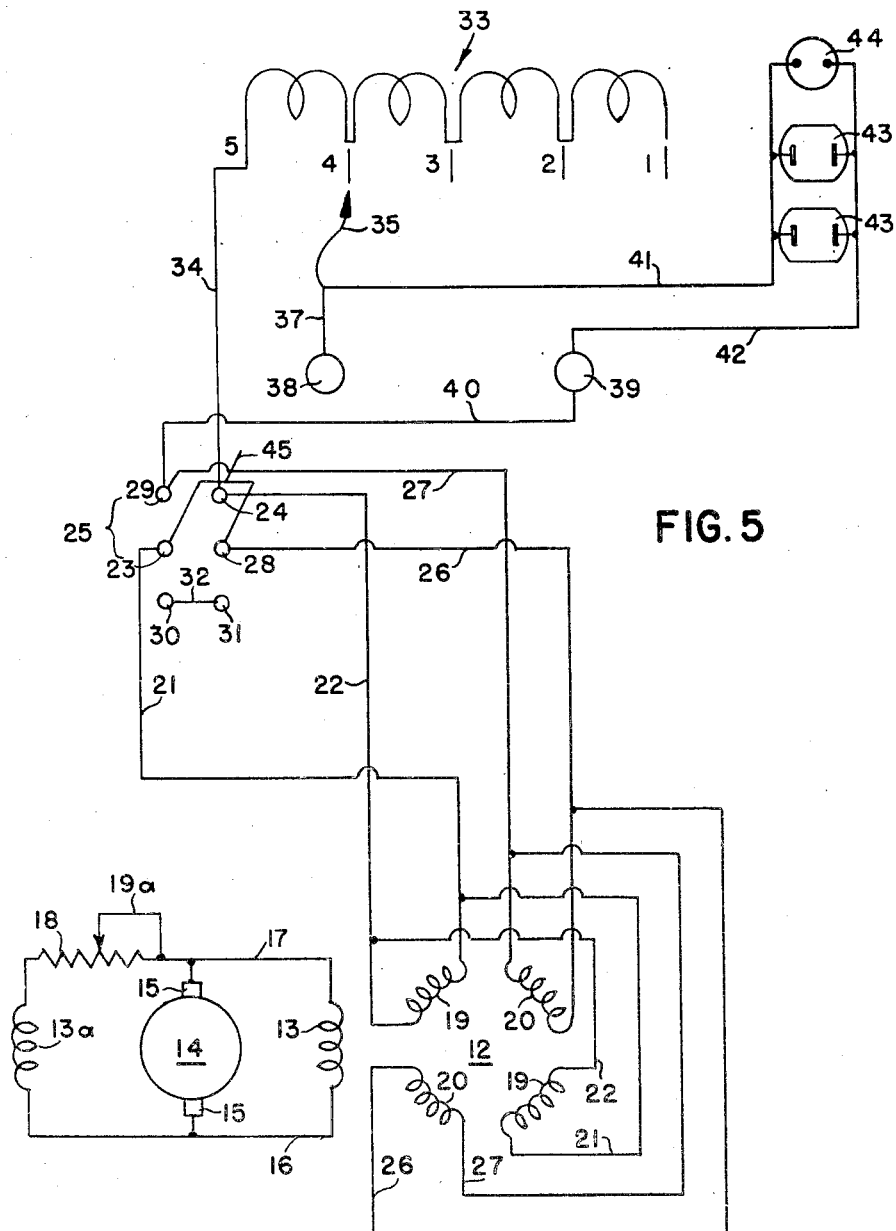
Figure 5 is an elementary wiring diagram incorporating the features of this invention.

The combination welder and power plant comprises a skid or frame 10 upon which is mounted any suitable prime mover, such as the internal combustion engine 11, to which is suitably connected in driving relationship the alternating current generator 12.

Referring particularly to the wiring diagram, Figure 5, the alternating current generator 12 preferably used in conjunction with this system of control is that of a rotating field type machine having field coils 13 carried on the rotor which is driven from the engine 11. The field coils 13 are excited from a suitable source of D. C. current which may preferably be an exciter generator 14 whose armature is connected through suitable brushes 15 to the leads 16 and 17 connected to the field coils 13. A variable resistance or rheostat 18 controlled by a suitable control member or knob 19a, Figure 2, is used to regulate the field coil 13a of the exciter 14 to adjust the A. C. generator voltage under conditions of both its operation in welding and in supplying power.

The generator 12 is provided with pairs of stator windings 19 and 20, the pairs 19 being connected in parallel to the leads 21 and 22. These leads 21 and 22 are respectively connected to the terminals 23 and 24 of a double-pole double-throw switch 25. The stator coils 20 are connected in parallel to the leads 26 and 27, which leads are respectively connected to terminals 28 and 29 of the double-pole double-throw switch 25. The terminals 30 and 31 of the switch 25 are connected together by a lead 32.

A variable reactor 33 is connected by a lead 34 to the terminal 24 of the switch 25. An adjustable tap 35 is movable to each of the positions 1, 2, 3, 4, or 5 of the reactor 33 by means of the control hand wheel 36, Figure 2, so as to vary the reactance to obtain the desired variable output and drooping voltage characteristics during welding operations. The movable tap 35 is connected by a suitable lead 37 to the welding electrode lead binding post 38. The welding ground binding post 39 is connected by lead 40 to the terminal 29 of the switch 25. Connected in parallel across the binding posts 38 and 39 by leads 41 and 42 are suitable outlet plugs 43 and also a volt meter 44 to indicate the voltage being supplied to these outlets when they are being used for power supply.

The double-pole double-throw switch 25 is actuated by a control lever 45. When the apparatus is to be used for welding, the control lever 45 of the switch 25 is moved to the welder position 45a to interconnect switch terminals 23 to 29 and 28 to 24. The hand wheel 36 is adjusted to select the desired tap on the reactor 33. The control rheostat 18 is adjusted by knob 19a to get the desired welding voltage. The ground lead 46, Figure 3, is then connected between the ground terminal 39 and the work piece 47 to be welded. The electrode 48 is then connected by its lead 49 to the electrode binding post 38. With the apparatus thus adjusted, the current and voltage characteristics will behave as shown in Figure 3a in performing the welding operations to give the variable output and the drooping voltage characteristics required under such conditions.

In order to adapt the apparatus for power supply and lighting, the control lever 45 of the double-pole double-throw switch 25 is moved to the power plant position 45b which interconnects switch terminals 23 to 30 and 28 to 31 so as to place the pairs of stator coils 19 and 20 in series to double the voltage from the generator 12. The control hand wheel 36 under these conditions is adjusted to the position 5 to directly interconnect lead 37 with lead 34 thereby cutting out the reactor from the circuit. Thus, terminal 24 of the double-pole double-throw switch 25 is connected to lead 41 while the terminal 29 of this switch 25 is connected to the lead 42 to provide a series circuit through lead 22, coils 19, leads 21, 32, and 26, coils 20 and lead 27 to thereby supply the higher power supply voltage directly to the outlet plugs 43. The rheostat 18 is adjusted by knob 19a to control the desired output power supply voltage indicated on the volt meter 44 connected in parallel with the plug outlets 43. Suitable power supply cords 50 and 51 may be connected to the plug outlets 43 to supply suitable lighting circuits 52 or electric motors 53, Figure 4. With the power supply circuit in operation, the voltage is maintained at a substantially constant point as illustrated in Figure 4a.

Thus, the alternating current revolving field type generator 12 driven by the prime mover or internal combustion engine 11 may be regulated by the double-pole double-throw switch for putting the stator windings 19 and 20 of the generator in either series or parallel connection so as to provide high voltages for power supply or lower voltages for welding. A range selection switch operated by the hand wheel 36 is utilized to adjust a variable reactor in welding operations or to eliminate the reactor from the circuit when the apparatus is used as a power plant. A field rheostat 18 is also provided for obtaining the intermediate steps for the welder control and to adjust the voltage for power plant use. Thus, the apparatus is readily adaptable for welding or power supply purposes by the simple adjustment of the control lever 45 and the hand wheel 36 with the appropriate connection of suitable power supply leads for welding or lighting and motor operation.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In an electric control circuit adapted to supply electric current for welding and power supply operation, the combination of a power driven generator, an exciter circuit operated to supply current to the field of said generator, rheostat control means in the field of said exciter for varying the voltage in the field of said generator, said generator having two pairs of windings; electric switch means, each pair of said windings being connected in parallel to said switch means, an output circuit comprising a variable reactor connected to said switch means, each of said pair of windings adapted to be connected in parallel or series with each other upon operation of said switch means to thereby provide low and high voltage respectively in said output circuit for welding and power supply operations.

2. In an electric control circuit adapted to supply electric current for welding and power supply operation, the combination of a power driven generator, an exciter circuit operated to supply current to the field of said generator, rheostat control means in the field of said exciter for varying the voltage in the field of said generator, said generator having two pairs of windings; electric switch means, each pair of said windings being connected in parallel to separate terminals of said switch means, an output circuit comprising a variable reactor connected to said switch means, a selector switch for varying the reactance of said reactor, output plugs and a voltmeter in said output circuit, each of said pair of windings adapted to be connected in parallel or series with each other upon operation of said switch means to thereby provide low and high voltage respectively in said output circuit for welding and power supply operations.

EDWARD A. HOBART.

REFERENCES CITED

The following references are of record in the file of this patent:

UNITED STATES PATENTS

| Number | Name | Date |
|---|---|---|
| 390,906 | Ries | Oct. 8, 1888 |
| 1,665,869 | Weed | Apr. 10, 1928 |
| 1,719,112 | Holslag | July 21, 1929 |
| 1,993,455 | Richards | Mar. 5, 1935 |
| 2,066,123 | ReQua | Dec. 29, 1936 |
| 2,080,388 | Langkau | May 11, 1937 |
| 2,176,341 | Hobart | Oct. 17, 1939 |